(12) United States Patent
Wood et al.

(10) Patent No.: US 9,746,323 B2
(45) Date of Patent: Aug. 29, 2017

(54) ENHANCED OPTICAL DETECTION AND RANGING

(71) Applicants: Rhande P. Wood, Weatherford, TX (US); Michael I. Jones, Azle, TX (US)

(72) Inventors: Rhande P. Wood, Weatherford, TX (US); Michael I. Jones, Azle, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 424 days.

(21) Appl. No.: 14/341,157

(22) Filed: Jul. 25, 2014

(65) Prior Publication Data

US 2016/0025488 A1 Jan. 28, 2016

(51) Int. Cl.
| | |
|---|---|
| *G01C 3/08* | (2006.01) |
| *H04N 5/225* | (2006.01) |
| *H04N 5/238* | (2006.01) |
| *H04N 13/02* | (2006.01) |

(52) U.S. Cl.
CPC .............. *G01C 3/08* (2013.01); *H04N 5/2259* (2013.01); *H04N 5/238* (2013.01); *H04N 13/0235* (2013.01)

(58) Field of Classification Search
CPC ............ G01B 11/2441; G01B 11/2518; G01B 11/2513; G01B 11/2509
See application file for complete search history.

(56) References Cited

U.S. PATENT DOCUMENTS

| | | |
|---|---|---|
| 4,965,442 A | 10/1990 | Girod et al. |
| 5,003,166 A | 3/1991 | Girod |
| 5,179,407 A | 1/1993 | Kusaka et al. |
| 5,231,443 A | 7/1993 | Subbarao |
| 5,448,241 A | 9/1995 | Zeoli et al. |
| 5,793,900 A | 8/1998 | Nourbakhsh et al. |
| 5,912,768 A | 6/1999 | Sissom et al. |

(Continued)

FOREIGN PATENT DOCUMENTS

| | | |
|---|---|---|
| WO | WO 00/16147 | 3/2000 |
| WO | WO 2004/084542 A1 | 9/2004 |

OTHER PUBLICATIONS

EPO Munich, Germany—Communication re: Extended European Search Report pursuant to Rule 62 EPC; for Application No. 15178249.7-1903; Ref. EP101542AK900te, dated Nov. 12, 2015.

(Continued)

*Primary Examiner* — Luke Ratcliffe
(74) *Attorney, Agent, or Firm* — Baker Botts L.L.P.

(57) ABSTRACT

In an embodiment, a method includes, for each field of view of a plurality of fields of view forming a field of regard, positioning a rotating disk in a first position corresponding to a first section of a plurality of sections. Each section of the plurality of sections may have a different focal length. The method further includes receiving a first image representing a first field of view, analyzing the first image, adjusting the plurality of mirrors based on the analysis, positioning the rotating disk in a second position corresponding to a second section, and receiving a second image representing the first field of view captured while the rotating disk was in the second position. The method further includes generating a range image of the field of view using at least the first image and the second image, and determining a range to a target using the range image.

20 Claims, 5 Drawing Sheets

(56) References Cited

U.S. PATENT DOCUMENTS

| | | |
|---|---|---|
| 6,229,913 B1 | 5/2001 | Nayar et al. |
| 6,442,476 B1 | 8/2002 | Poropat |
| 7,705,970 B2 | 4/2010 | Piestun et al. |
| 7,709,773 B2 | 5/2010 | Yamashita et al. |
| 8,400,511 B2 | 3/2013 | Wood et al. |
| 8,451,452 B2 | 5/2013 | Podoleanu et al. |
| 8,620,065 B2 | 12/2013 | Piestun et al. |
| 2002/0012064 A1 | 1/2002 | Yamaguchi |
| 2006/0178830 A1 | 8/2006 | Sherony |
| 2008/0243383 A1 | 10/2008 | Lin |
| 2009/0128824 A1 | 5/2009 | Leitgeb et al. |
| 2010/0316305 A1 | 12/2010 | Hong |
| 2011/0164108 A1 | 7/2011 | Bates et al. |
| 2012/0154668 A1* | 6/2012 | Kimura .................. G01C 3/32 348/348 |
| 2012/0307260 A1* | 12/2012 | Keshavmurthy .. G01B 11/2441 356/610 |
| 2013/0141538 A1 | 6/2013 | DaneshPanah et al. |
| 2014/0009611 A1 | 1/2014 | Hiebl et al. |
| 2014/0049633 A1 | 2/2014 | Pretorius et al. |

OTHER PUBLICATIONS

V. Aslantas, et al., "Depth from Automatic Defocusing," 2007 Optical Society of America, Feb. 5, 2007, vol. 15, No. 3, Optics Express 1011, (C) 2007 OSA, 13 pages.

Ming-Chao Chiang, et al., "Local Blur Estimation and Super-Resolution," 1997 IEEE CVPR Proceedings, copyrighted, Jun. 17-19, 1997, ISBN: 0-8186-7822-4, 6 pages.

\* cited by examiner

ENHANCED OPTICAL DETECTION AND RANGING

TECHNICAL FIELD

This disclosure generally relates to optics, and more particularly to enhanced optical detection and ranging.

BACKGROUND

The use of unmanned vehicles is becoming more mainstream. For example, some companies are using unmanned vehicles to deliver packages. As another example, some farmers are using unmanned vehicles to fertilize crops. As another example, some companies are developing self-driven cars. As the use of these unmanned vehicles increases, the need for sense-and-avoid technology also increases.

BRIEF DESCRIPTION OF THE DRAWINGS

For a more complete understanding of the present disclosure and for further features and advantages thereof, reference is now made to the following description taken in conjunction with the accompanying drawings, in which.

DETAILED DESCRIPTION

Unmanned vehicles in may include drones, missiles, self-driven cars, boats, or any other type of vehicle. Each of those unmanned vehicles may be faced with obstacles that it should sense and avoid. In order to sense and avoid those obstacles, unmanned vehicles may include optical systems that allow for detection of obstacles.

Current optical systems, however, have numerous drawbacks. For example, some optical systems incorporate a focal plane array that is moved using a piezo-electric motion control element, which causes vibration problems and reduces image quality. Additionally, moving the focal plane array using the piezo-electric motion control element reduces the frame rate at which the focal plane array can be operated. As another example, some optical systems may capture two wide field-of-view images simultaneously, which results in an image with one half of the maximum light intensity. As yet another example, some optical systems may be implemented using emissions, such as lasers, acoustics, or radar. However, each of those emissions is detectable, which can increase vulnerability in a military environment.

Accordingly, aspects of the present disclosure include a method that, in one embodiment, for each field of view of a plurality of fields of view forming a field of regard, positions a rotating disk in a first position corresponding to a first section of a plurality of sections of the rotating disk. Each section of the plurality of sections may have a different focal length. Additionally, for each field of view, the method may include receiving a first image representing a first field of view captured while the rotating disk was in the first position, analyzing the first image to determine whether to adjust a plurality of mirrors on a spatial light modulator, adjusting the plurality of mirrors based on the analysis, positioning the rotating disk in a second position corresponding to a second, section, of the plurality of sections, and receiving a second image representing the first field of view captured while the rotating disk was in the second position. The method may further include, for each field of view, generating a range image of the field of view using at least the first image and the second image, and determining a range to a target using the range image.

Enhanced optical detection and ranging of the present disclosure may provide numerous advantages. For example, potential vibration problems are eliminated by eliminating the piezo-electric motion control element that moves the focal plane array. Additionally, eliminating the piezo-electric motion control element reduces the weight, volume, and cost associated with the optical system. Furthermore, the optical system may operate at a higher frame rate because of the elimination of the piezo-electric motion control element. As another example, the optical system captures images and determines a range to an object without detectable emissions, such as radar, laser, or acoustics. Because the optical system is passive, system vulnerability is reduced.

Figure 1:
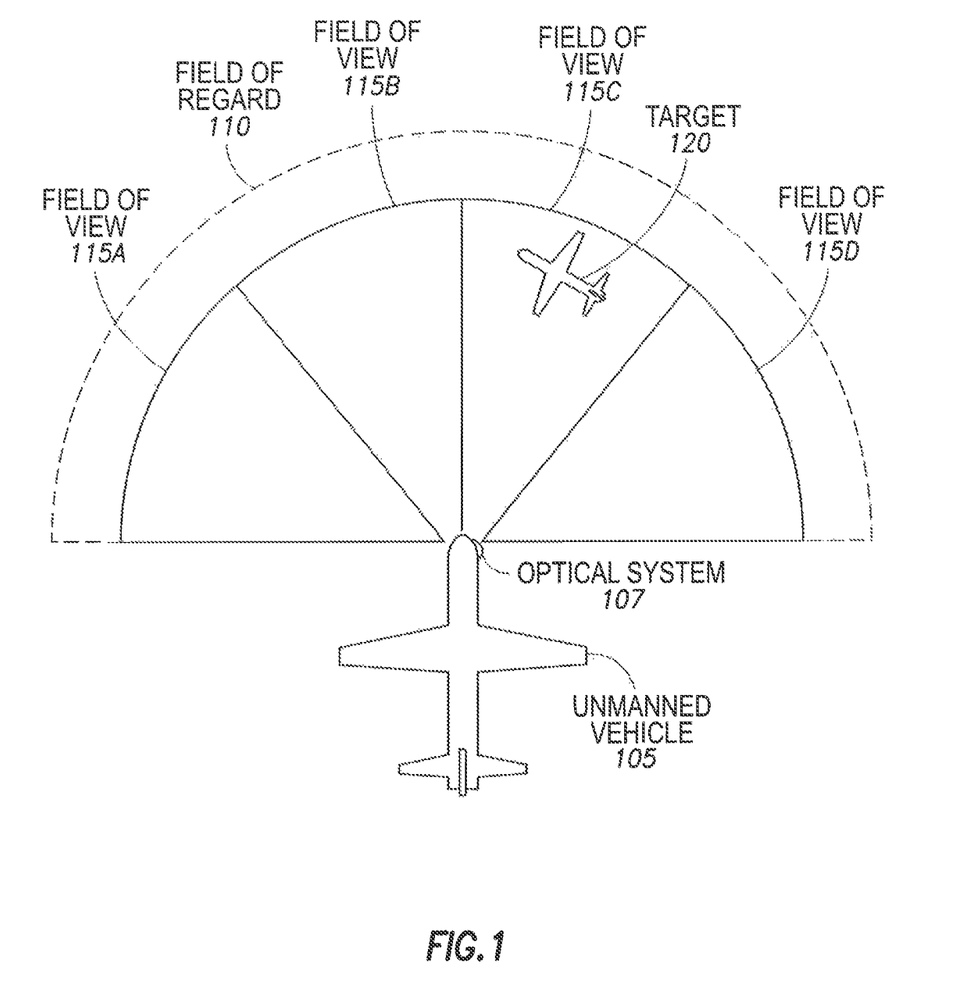
FIG. 1 is a diagram illustrating an example environment of an example unmanned vehicle, according to certain embodiments of the present disclosure.
Figure 2:
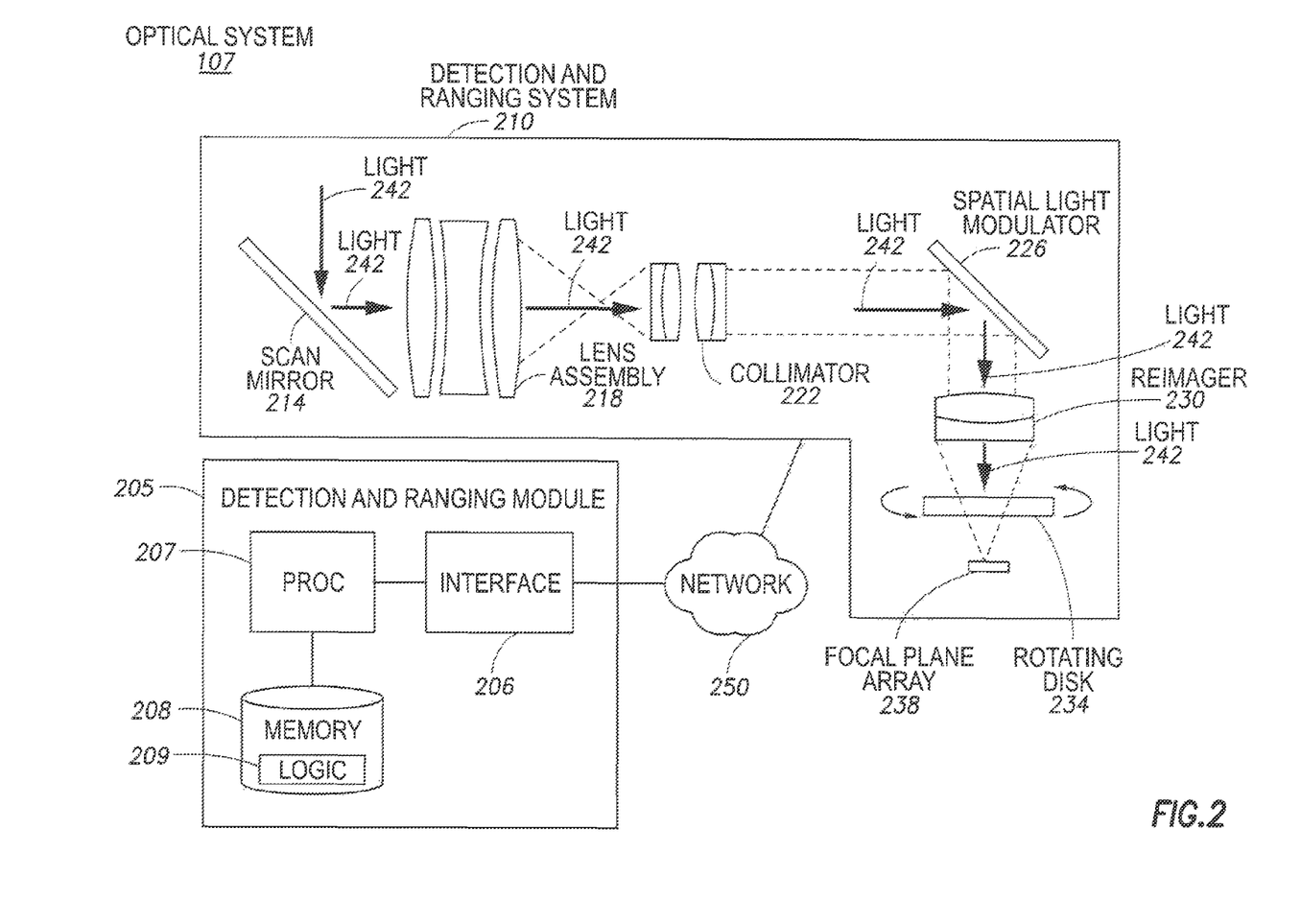
FIG. 2 is a diagram illustrating an example optical system used in the unmanned vehicle of FIG. 1, according to certain embodiments of the present disclosure.
Figure 3:
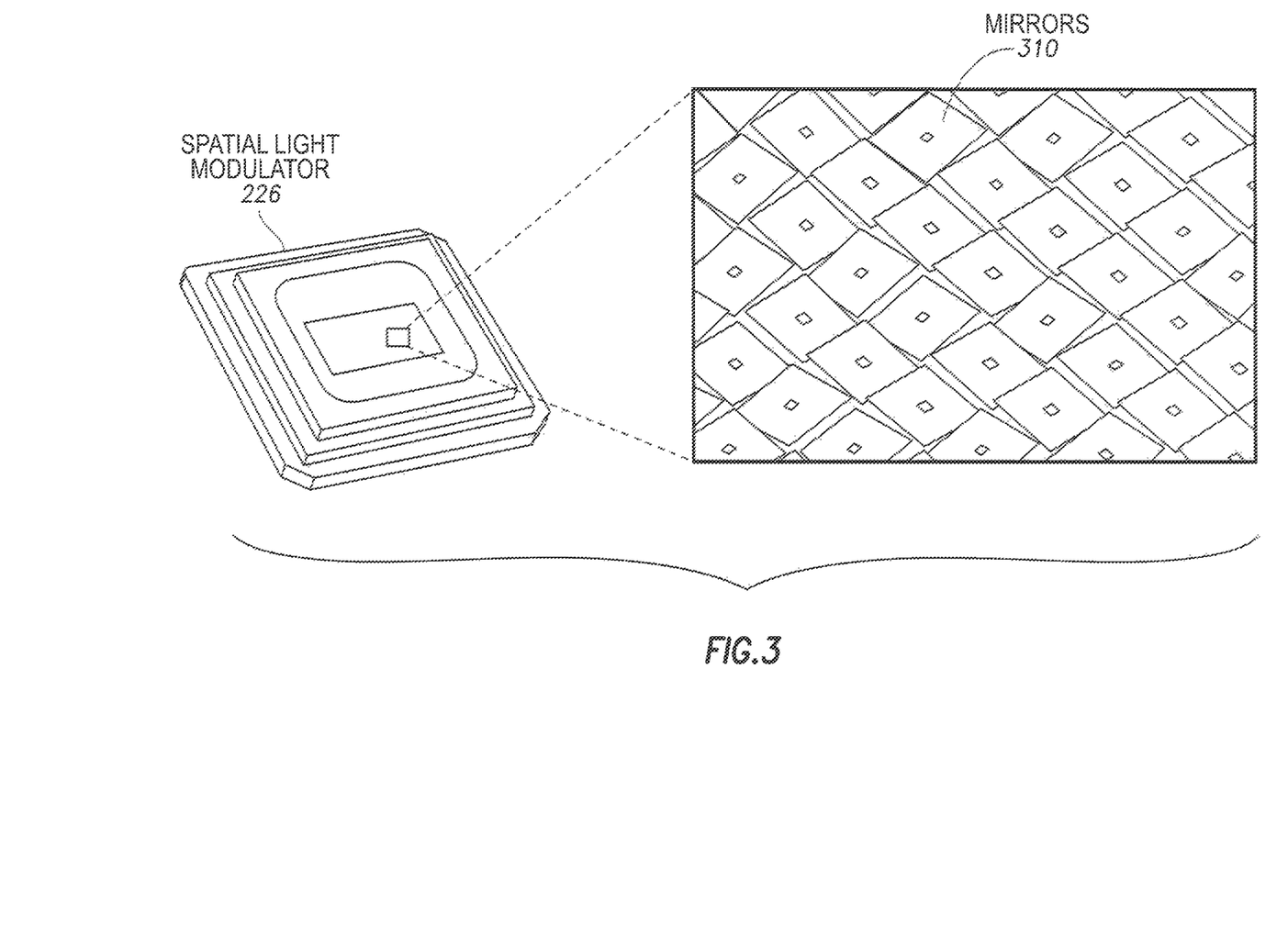
FIG. 3 is an example spatial light modulator used in the optical system of FIG. 2, according to certain embodiments of the embodiments of the present disclosure.
Figure 4:
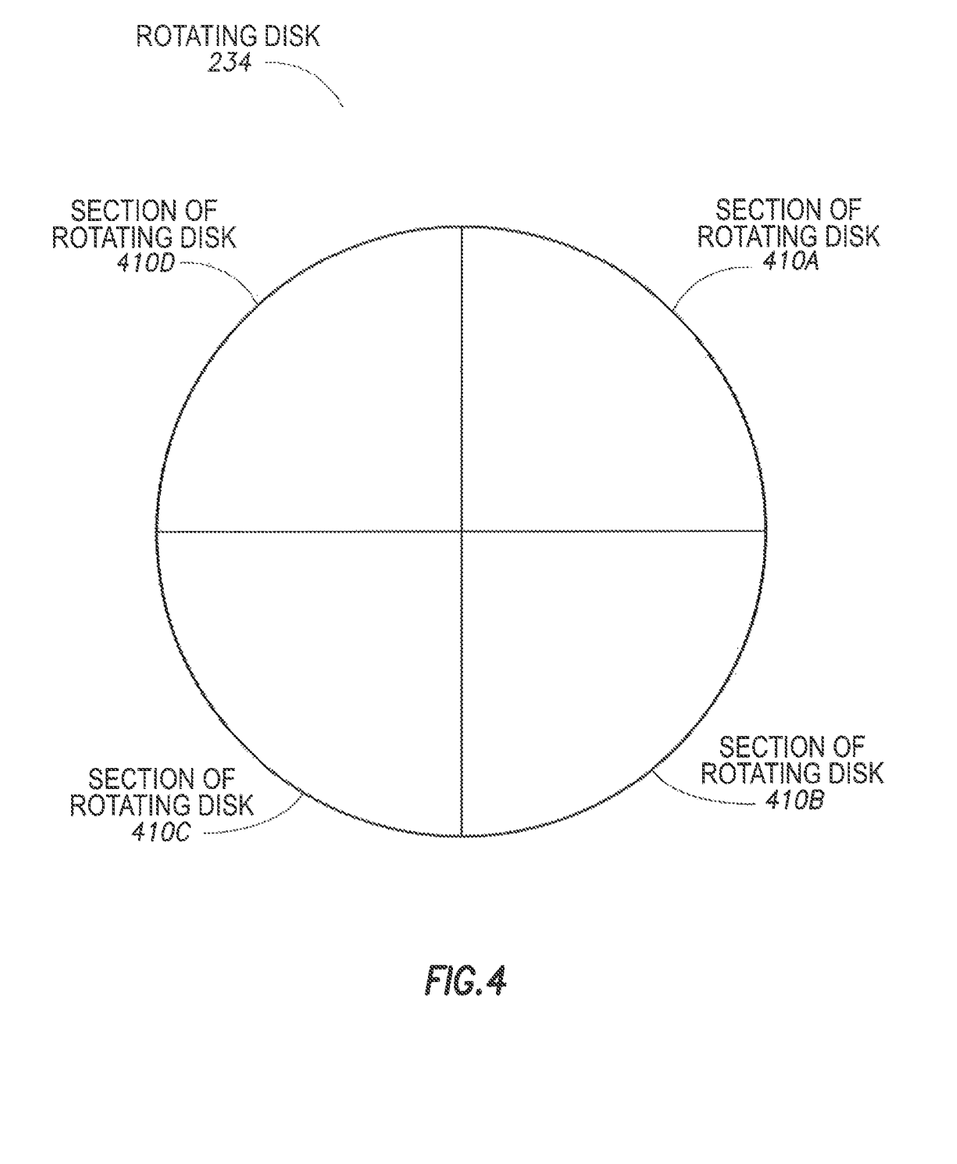
FIG. 4 is an example rotating disk used in the optical system of FIG. 2, according to certain embodiments of the present disclosure.
Figure 5:
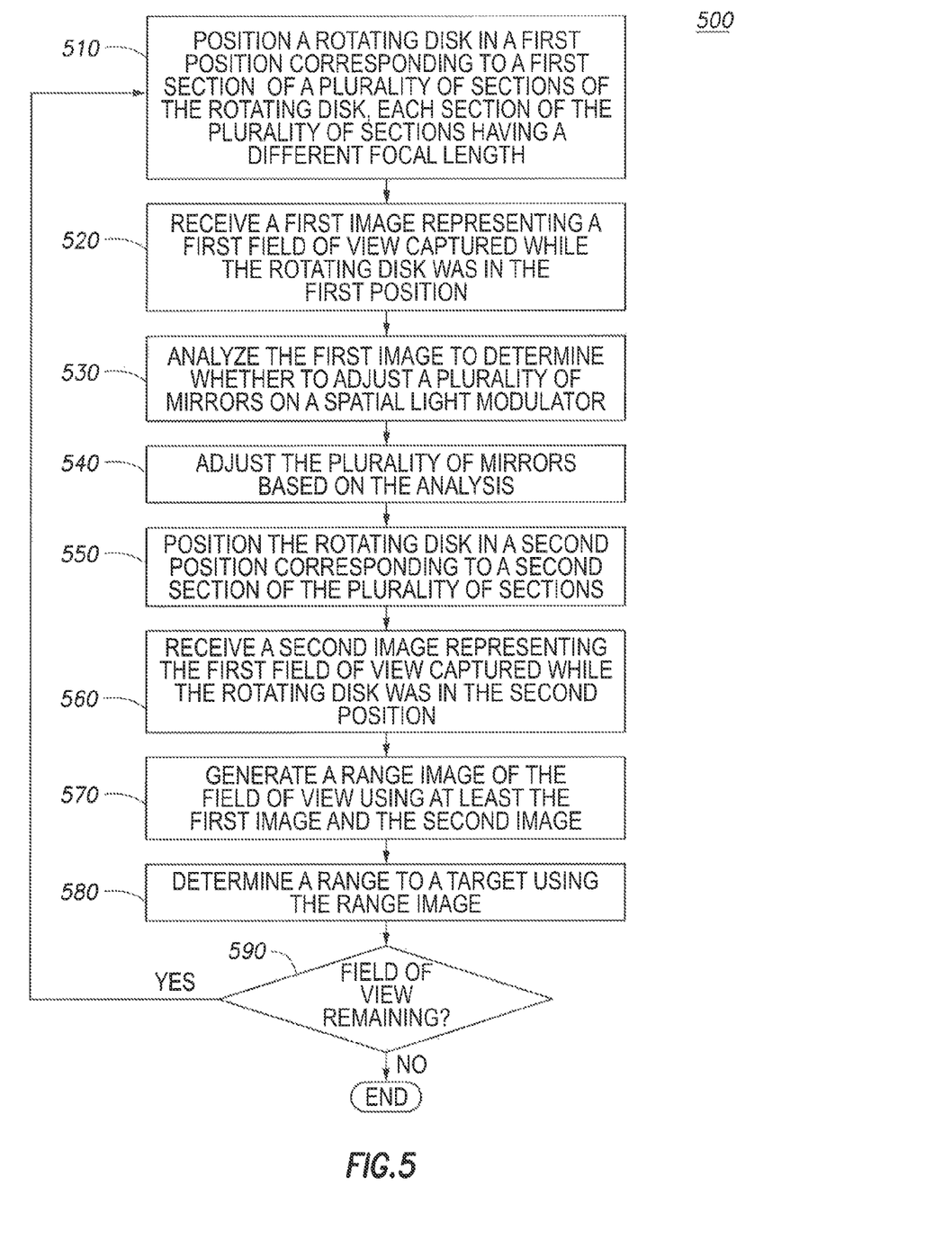
FIG. 5 is a flow chart illustrating an example method of enhanced detection and ranging, according to certain embodiments of the present disclosure.

Additional details are discussed in FIGS. 1 through 5. FIG. 1 illustrates an example environment of an example unmanned vehicle 105. FIG. 2 shows an example optical system 107 for use in unmanned vehicle 105. FIGS. 3 and 4 show an example spatial light modulator 226 and an example rotating disk 234, respectively, for use in optical system 107 of FIG. 2. FIG. 5 shows an example method of enhanced, detection and ranging.

FIG. 1 illustrates an example environment or unmanned vehicle 105, according to certain embodiments of the present disclosure. As described in more detail below, unmanned vehicle 105 may use optical system 107 to detect target 120 and determine a range to target 120 using a range image generated from measurements on images captured with optical system 107. Unmanned vehicle 105 may include optical system 107 in an embodiment. Optical system 107 may operate within field of regard 110 in certain embodiments. Field of regard 110 may include field of view 115A, field of view 115B, field of view 115C, and field of view 115D in an embodiment. As shown in the illustrated embodiment, field of regard 110 may include target 120.

Unmanned vehicle 105 may be any type of vehicle without a person on board in certain embodiments. For example, unmanned, vehicle 105 may be an unmanned aerial vehicle. As another example, unmanned vehicle 105 may be an unmanned ground vehicle configured to operate on land or water. As yet another example, unmanned vehicle 105 may be a missile. However, in some embodiments, unmanned vehicle 105 may include a person. For example, unmanned vehicle 105 may be a self-driven car. In some embodiments, unmanned vehicle 105 may be remote controlled. In other embodiments, unmanned vehicle 105 may sense its environment and navigate on its own. Unmanned vehicle 105 may include optical system 107 in some embodiments.

Optical system 107, as described in more detail with respect to FIG. 2, may be any optical system configured to generate a range image of a field of view (e.g., any of fields of view 115A-115D) using multiple images each corresponding to a different section of a rotating disk (e.g., sections 410A-410D of rotating disk 234 as illustrated in FIG. 4) in an embodiment. Unmanned vehicle 105 may carry optical system 107 in certain embodiments. For example, optical system 107 may be mounted near the nose of unmanned vehicle 105. Optical system 107 may operate within field of regard 110 in certain embodiments.

Field of regard 110 may be an angle or angles over which optical system 107 operates. Field of regard 110 may include a plurality of fields of view 115A-115D in some embodiments. For example, field of regard 110 may include four fields of view 115A-115D. Although field of regard 110 is illustrated with four fields of view 115A-115D, field of regard 110 may include any number of fields of view greater than or equal, to two fields of view. For example, field of regard 110 may include field of view 115A and field of view 115B.

Fields of view 115A-115D may be any fixed angular coverage in certain embodiments. In other words, fields of view 115A-115D may be any amount of coverage optical system 107 provides at a fixed-look direction. For example, field of view 115A may be 10° by 10°. As another example, field of view 115A may be 2° by 3°. Although those examples of field of view 115A are described as having particular angular dimensions, fields of view 115A-115D may be any size. Target 120 may operate within field of regard 110, including any field of view 115A-115D in an embodiment.

Target 120 may be an object or obstacle in certain embodiments. For example, target 120 may be an aerial vehicle, such as a plane or helicopter. As another example, target 120 may be a missile or bullet. As yet another example, target 120 may be a car, truck, or boat. As another example, target 120 may be a stop light, road sign, person, road debris, or structure. Optical system 107 may capture defocused images of a field of view 115A-115D and generate a range image for the particular field, of view using the captured images to determine a range to target 120. In some embodiments, optical system 107 may form a composite range image of field of regard 110 by combining range images for each field of view 115A-115D in field of regard 110. Once the range to target 120 is determined, unmanned vehicle 105 may perform any type of maneuver, such as avoiding target 120.

FIG. 2 illustrates an example optical system 107 used in unmanned vehicle 105, according to certain embodiments of the present disclosure. As described above, optical system 107 may be configured to generate a range image of field of a field of view using multiple defocused images each corresponding to a different section 410A-410D of rotating disk 234 in an embodiment. Optical system 107 may include detection and ranging module 205, detection and ranging system 210, and network 250 in some embodiments.

Detection and ranging module 205 may be any component configured to position rotating disk 234 in a plurality of positions, receive a plurality of images, analyze at least one of the images to determine whether to adjust mirrors on a spatial light modulator 226, generate a range image using at least the plurality of images, and determine a range to target 120 using the range image in an embodiment. Detection and ranging module 205 may be coupled directly to detection and ranging system 210 or through network 250. Detection and ranging module 205 may include an interface 206, a processor 207, memory 208, and logic 209.

Interface 206 may be any suitable device configured to receive information from network 250, transmit information through network 250, perform processing of information, communicate with other devices, or any combination of the preceding. For example, interlace 206 may receive an image representing field of view 115A from, detection and ranging system 210 through network 250. As another example, interface 206 may send a command through network 250 to detection and ranging system 210 thereby causing spatial light modulator 226 to adjust mirrors 310. As yet another example, interface 206 may send a command through network 250 to detection and ranging system 210 thereby causing rotating disk 234 to rotate to a different position. In an embodiment, interface 206 represents any port or connection, real or virtual, including any suitable hardware and/or software, including protocol conversion and data processing capabilities, to communicate through a LAN, WAN, MAN, or other communication system that, allows detection and ranging module 205 to exchange information with detection and ranging system 210 through network 250. Interface 206 may be communicatively coupled to processor 207 in certain embodiments.

Processor 207 communicatively couples with interface 206 and memory 200, and controls the operation and administration of detection and ranging module 205 by processing information received, from interface 206 and memory 208 in an embodiment. Processor 207 includes any hardware and/or software that operates to control and process information. For example, processor 207 executes logic 209 to control the operation of detection and ranging module 205. Processor 207 may be a programmable logic device, a microcontroller, a microprocessor, any suitable processing device, or any suitable combination of the preceding.

Memory 203 stores, either permanently or temporarily, data, operational software, or other information for processor 207. Memory 208 includes any one or a combination of volatile or non-volatile local or remote devices suitable for storing information. For example, memory 208 may include RAM, ROM, magnetic storage devices, optical storage devices, or any other suitable information storage device or a combination of these devices. Memory 208 may include any suitable information for use in the operation of detection and ranging module 205. In the illustrated embodiment, memory 205 includes logic 209.

Logic 209 generally refers to logic, rules, algorithms, code, tables, and/or other suitable instructions embodied in a computer-readable storage medium for performing the described functions and operations of detection and ranging module 205. Logic 209 may perform multiple functions and operations for each field of view 115A-115D of a plurality of fields of view 115A-115D forming field of regard 110. For example, logic 209 may position rotating disk 234 in a first position corresponding to a first section 410A of a plurality of sections 410A-410D of rotating disk 234. Logic 209 may receive a first image representing a first field of view 115. A captured while rotating disk 234 was in the first position and analyze the first image to determine whether to adjust mirrors 310 on spatial light modulator 226. Logic 209 may adjust mirrors 310 based on the analysis and position rotating disk 234 in a second position corresponding to a second section 410B of the plurality of sections 410A-410D. Logic 209 may receive a second image representing the first field of view 115A captured while rotating disk 234 was in the second position. In some embodiments, each of the first and second images may be defocused images. In other embodiments, at least one of the two or more images may be defocused images. Logic 209 may generate a range image of field of view 115A using at least the first and second image and determine a range to target 120 using the range image. In some embodiments, logic 209, for at least one field of view of a plurality of fields of view 115A-115D, may position rotating disk 234 in each of sections 410A-410D a plurality of times.

Network 250 may be any suitable network operable to facilitate communication between the components of optical system 107, such as detection and ranging module 205 and detection and ranging system 210. Network 250 may include any interconnecting system capable of transmitting electrical, audio, video, light, data, messages, signals or any combination of the preceding. Network 250 may include all or a portion of a public switched telephone network (PSTN), a public or private data network, a local area network (LAN), a metropolitan area, network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Detection and ranging system 210, in coordination with detection and ranging module 205, facilitates the generation of a range image and the determination of a range to target 120 using the range image. Detection and ranging system 210 may receive light 242, which may pass through or be reflected by various components of detection and ranging system 210, including a scan mirror 214, a lens assembly 218, a collimator 222, a spatial, light modulator 220, a reimager 230, rotating disk 234, and a focal plane array 238 in an embodiment.

Scan mirror 214 may be configured to receive light 242 from the environment and direct light 242 to lens assembly 218 in some embodiments. Scan mirror 214 may scan through a plurality of fields of view 115A-115D to cover the entire field of regard 110 in an embodiment. Scan mirror 214 may be moved by any type of component, including, for example, a galvanometer mechanism, a piezoelectrical actuator, or a stepper motor. Scan mirror 214 may be in optical communication with lens assembly 518 in an embodiment. Multiple scan mirrors may be used to increase vertical coverage if needed for a particular application.

Lens assembly 218 may be configured to gather and focus light 242 on collimator 222 in an embodiment. Lens assembly 213 may be well corrected over the aperture, spectral band, and each of fields of view 115A-115D to produce a flat field with the sharpest imagery and lowest distortion possible. Lens assembly 218 may be in optical communication with collimator 222 in an embodiment.

Collimator 222 may be configured to receive light 242 from lens assembly 218 and collimate the received light 242. That is, collimator 222 may produce parallel light waves to enable interaction with spatial light modulator 226. In some embodiments, the diameter of the front lens of collimator 222 is greater than the diameter of the exit lens of collimator 222, which reduces the diameter of the collimated light 242. For example, if the diameter of the front lens of collimator 222 is six inches and collimator 222 is a 6× collimator, the diameter of the collimated light 242 at the exit lens is one inch. Such a reduction in diameter may allow for a smaller spatial light modulator 226, which reduces cost and saves space. Collimator 222 may be in optical communication with spatial light modulator 226 in some embodiments.

Spatial light modulator 226 may be any type of spatial light modulator in certain embodiments. For example, spatial light modulator 226 may be a reflective spatial light modulator. As another example, spatial light modulator 226 may be a translucent spatial light modulator. As yet another example, spatial light modulator 226 may be an infrared spatial light modulator. Spatial light modulator 226 has multiple functions. For example, spatial light modulator 226 may reduce the amount of light 242 not coming from a target of interest, such as target 120. In that example, spatial light modulator 226 may reflect away at least some of light 242 that is not of interest to reduce blurring effects of any extraneous light. As another example, spatial light modulator 226 may reduce the amount of light 242 passed to reimager 230 thereby ensuring that light 242 is not bright enough to damage focal plane array 238. In some embodiments, spatial light modulator 226 may include mirrors 310 (described below). Detection and ranging module 205 may provide a signal to spatial light modulator 226 thereby causing spatial light modulator 226 to adjust at least some of mirrors 310. For example, detection and ranging module 205 may provide a signal to spatial light modulator 226 to adjust mirrors 310 so that less light is passed to focal plane array 238. Spatial light modulator 226 may receive a signal from detection and ranging module 205 to adjust mirrors 310 for each field of view 115A-115D. Spatial light modulator 226 may be in optical communication with reimager 230 in some embodiments.

Reimager 230 may be configured, to refocus light 242 in certain embodiments. That is, reimager 230 receives the collimated light 242 from spatial light modulator 226 and refocuses light 242 so that it may come to a fixed focus in an embodiment. Reimager 230 may be in optical communication with rotating disk 234 in certain embodiments.

Rotating disk 234 may be a component configured to shift the focal point away from focal plane array 238 in an embodiment. Rotating disk 234, as described below, may have multiple sections 410A-410D each having a different focal length in certain embodiments. Different focal lengths may be achieved in multiple ways. In some embodiments, each section 410A-410D may have a different thickness, which results in different focal lengths. In other embodiments, rotating disk 234 may be a constant thickness, but each section 410A-410D may have a different index of refraction, which results in different focal lengths. For example, each section 410A-410D may be made of a different material having a different index of refraction. When light refracts through each section 410A-410D, the focal point may shift away from focal plane array 236. As the thickness of rotating disk 234 increases, the distance that the focal point shifts away from focal plane array 238 also increases. Such a shift in focal point allows for the generation of a defocused image, which can be used to generate a range image and determine a range to target 120. Rotating disk 234 may have any number of sections 410A-410D greater than or equal to two. For example, rotating disk 234 may have three sections. As another example, rotating disk 234 may have four sections. Once an image is captured, rotating disk 234 may be rotated to a different position by any component configured to cause rotating disk 234 to rotate. For example, rotating disk 234 may be rotated using an electrical motor. In some embodiments, the position of rotating disk 234 is synchronized with adjustments to mirrors 310 on spatial light modulator 226 so that spatial light modulator 226 adjusts mirrors 310 as rotating disk 234 rotates into position. Rotating disk 234 may be made of any material, such as fused silica, flint glass, crown glass, or any other material. Rotating disk 234 may be in optical communication with focal plane array 238 in an embodiment.

Focal plane array 238 may be an image detector configured to receive light 242 and capture an image in an embodiment. For example, focal plane array 233 may capture an image representing field of view 115A. In that example, focal plane array 238 may capture an image representing field of view 115A for each section 410A-410D of rotating disk 234. Focal plane array 238 may send a captured image so detection and ranging module 205 via network 250 in an embodiment.

FIG. 3 illustrates an example spatial light modulator 226 used in optical system 107, according to certain embodiments of the present disclosure. As described above, spatial light modulator 226 may reduce the amount of light 242 not coming from target 120 or reduce the amount of light 242 passed to focal plane array 238. Spatial, light modulator 226 may be in optical communication with reimager 230 in an embodiment. Spatial light modulator 226 may be communicatively coupled to detection and ranging module 205 through network 250 in an embodiment. Spatial light modulator 226 may include a plurality of mirrors 310 in an embodiment.

Mirrors 310, generally, may be configured to reflect light 242 in an embodiment. Mirrors 310 may be adjusted in certain embodiments. For example, detection and ranging module 205 may send a signal to spatial light modulator 226 to adjust mirrors 310. In that example, the signal may contain certain bits that are set that, indicate whether to adjust mirrors 310 to a particular position. In some embodiments, the signal may indicate a subset of mirrors 310 to adjust. In certain embodiments, mirrors 310 may be adjusted based, on analysis of an image. For example, detection and ranging module 205 may analyze an image and adaptively adjust mirrors 310 to change the amount of light 242 passed to focal plane array 238. Mirrors 310 may be adjusted once for each section 410A-410D of rotating disk 234 in certain embodiments. That is, mirrors 310 may be rotated each time rotating disk 234 is rotated to a different section 410A-410D in an embodiment. For example, if rotating disk 234 has four sections 410A-410D resulting in four rotations, then mirrors 310 will be adjusted four times. In some embodiments, mirrors 310 may be adjusted each time an image is captured. Mirrors 310 may be adjusted while the rotating disk 234 rotates to its next position so that mirrors 310 are in their adjusted position when rotating disk 234 is in its next position in an embodiment. In some embodiments, mirrors 310 may be adjusted prior to rotation of rotating disk 234. In certain embodiments, the adjustment of mirrors 310 may be synchronized with the rotation of rotating disk 234 so that they begin at the same time. For example, the rotation of rotating disk 234 and adjustment of mirrors 310 may be synchronously triggered by focal plane array 238 capturing an image. Mirrors 310 may include an infrared coating in some embodiments.

FIG. 4 illustrates an example rotating disk 234 used in optical system 107, according to certain embodiments of the present disclosure. Rotating disk 234 may facilitate images with different focal length settings because each section 410A-410D may have a different focal length in an embodiment. Rotating disk 234 may be in optical communication with focal plane array 238 in an embodiment. Rotating disk 234 may be communicatively coupled to detection and ranging module 205 through network 250 in an embodiment. Rotating disk 234 may include sections 410A-410D in some embodiments.

Sections 410A-410D may each have a different focal length in an embodiment. As a result of the different focal lengths, a defocused image may be captured that can be used to generate a range image and determine a range to target 120. Different focal lengths may be achieved in multiple ways. For example, sections 410A-410D may each be a different thickness. As another example, sections 410A-410D may nave a different index of refraction, but a constant thickness. In that example, each of sections 410A-410D may be made of a different material having a different index of refraction. Rotating disk 234 may be made using any type of material, such as, for example, fused silica, crown glass, flint glass, or any other material. Although illustrated as having four sections 410A-410D, any number of sections greater than or equal to two may be used. For example, rotating disk 234 may have five sections.

Rotating disk 234 may rotate a number of times corresponding to the number of sections 410A-410D in an embodiment. For example, if rotating disk 234 includes four sections 410A-410D, rotating disk 234 may rotate four times. As another example, if rotating disk 234 includes two sections, rotating disk 234 may rotate two times. For each field of view 115A-115D, rotating disk 234 may rotate through all sections 410A-410D of rotating disk 234 in an embodiment. By rotating through all sections 410A-410D for each field of view 115A-115D, optical system 107 captures images having different focal lengths. For example, for field of view 115A, optical system 107 may capture an image for each of sections 410A-410D, which will result in four images with four different focal lengths. In other embodiments, rotating disk 234 may rotate an entire 360 degrees multiple times such that multiple sets of defocused images are captured for a particular field of view. For example, in a mode in which scan mirror 214 is tracking a slow moving target so that field of view 115A varies slowly, rotating disk 234 may rotate through each of sections 410A-410D multiple times for field of view 115A. In that example, multiple sets of defocused images are collected for field of view 115A. Rotating disk 234 may rotate in a direction from the thinnest section 410A-410B to the thickest section 410A-410D in an embodiment. Rotating disk 234 may be rotated by any component configured to cause rotation. For example, rotating disk 234 may be rotated by an electrical motor. By coupling a rotation component to rotating disk 234 rather than focal plane array 238, unwanted vibration may be eliminated. In an embodiment, detection and ranging module 205 may send a signal causing the rotation of rotating disk 234.

FIG. 5 illustrates an example method of enhanced detection and ranging, according to certain embodiments of the present disclosure. Method 500 begins at step 510 where rotating disk 234 is positioned in a first position corresponding to a first section 410A of a plurality of sections 410A-410D of rotating disk 234. As described above, each section 410A-410D of the plurality of sections 410A-410D may nave a different focal length. For example, each section 410A-410D may have a different thickness resulting in a different focal length. In some embodiments, detection and ranging module 205 causes rotating disk 234 to rotate into she first position by sending a signal to rotating disk 234.

At step 520, a first image representing a first field of view 115A captured while rotating disk 234 was in the first position is received. In some embodiments, detection and ranging module 205 receives tire first image from focal plane array 238 through network 250.

At step 530, the first image is analyzed to determine whether to adjust a plurality of mirrors 310 on spatial light modulator 226. In some embodiments, detection and ranging module 205 analyses the first image to determine how to adjust mirrors 310. For example, detection and ranging module 205 may analyze the image and determine that more or less light should be passed to focal plane array 238. In some embodiments, defection and ranging module 205 may determine a level of brightness associated with the image. In response to the analysis, detection and ranging module 205 may adaptively adjust mirrors 310 in an embodiment. For example, detection and ranging module 205 may send a signal to spatial light modulator 225 via network 250 causing spatial light modulator 226 to adjust mirrors 310. In that example, the signal may include bits that sire set, which may indicate how to adjust mirrors 310.

At step 540, the plurality of mirrors 310 are adjusted based on the analysis performed in step 530. In some embodiments, detection and ranging module 205 sends a signal to spatial light modulator 226 causing spatial light modulator 226 to adjust mirrors 310. For example, detection and ranging module 205 may determine in step 530 that mirrors 310 should be adjusted so that less light 242 passes to focal plane array 238 and send a signal configured to cause spatial light modulator 226 to adjust mirrors 310 so that the amount of light 242 passed to focal plane array 238 is reduced. Mirrors 310 may be adjusted as rotating disk 234 is rotated into position in some embodiments. Mirrors 310 may be adjusted prior to rotating disk 234 rotating into position in an embodiment. The adjustment of mirrors 310 may be synchronized with the rotation of rotating disk 234 so that the adjustment and rotation occur at the same time in an embodiment. Mirrors 310 may be adjusted each time focal plane array captures an image in certain embodiments. In some embodiments, mirrors 310 may be adjusted for every rotation of rotating disk 234. For example, if rotating disk 234 has four sections 410A-410D such that rotating disk 234 rotates four times for each field of view 115A-115D, mirrors 310 may adjust four times.

At step 550, rotating disk 234 is positioned in a second position corresponding to a second section 410B of the plurality of sections 410A-410D of rotating disk 234. In some embodiments, detection and ranging module 205 causes rotating disk 234 to rotate into the second position by sending a signal to rotating disk 234.

At step 560, a second image representing the first field of view 115A captured while rotating disk 234 was in the second position is received. In some embodiments, detection and ranging module 205 receives the second image from focal plane array 238 through network 250. In some embodiments, for each section 410A-410D, detection and ranging module 205 may adjust mirrors 310, cause the rotation of rotating disk 234, receive an image, and analyze the image. In some embodiments, once detection and ranging module 205 receives an image corresponding to each section 410A-410D for one field of view 115A-115D, detection and ranging module 205 may generate a range image for that field of view 115A-115D using each of the received images.

At step 570, a range image of field of view 115A is generated using at least the first image and the second image. Each of the first and the second images may have a different focus in an embodiment. In other embodiments, at least one of the first and second images may be defocused. For example, the first image may be defocused, while the second image may not be defocused. In some embodiments, detection and ranging module 205 may generate the range image of field, of view 115A using at least the first and second images. Detection, and ranging module 205 may generate a range image of field of regard 110 using range images of each, field of view 115A-115D in some embodiments. For example, detection and ranging module 205 may combine each range image of fields of view 115A-115D to form a range image for field of regard 110.

A range image may be generated from two or more images of any field of view 115A-115D in an embodiment. In some embodiments, at least one of the two or more images may be defocused. In other embodiments, each of the two or more images may be defocused. The point spread function due to defocus and the point spread function due to the nominal lens system optics may both be two dimensional Gaussian functions in an embodiment. The range to points in the range image may be determined by the amount of defocus determined at each point in some embodiments. Additionally, in some embodiments, the range to points in the range image may be determined by the parameters of the optics system. The parameters may include, for example, the focal length of the optics system, the diameter of the first lens in the optics system, or the spatial constant of the optics corrected blur (i.e., the point spread function). The standard deviation of the two-dimensional Gaussian blur function may be measured on the image plane at a known defocus setting using a local blur estimation algorithm. Subpixel computations and appropriate multiple range estimates are averaged to improve performance. Range images produced may be limited to areas of interest based on blob and/or edge detectors or other algorithms in some embodiments to speed processing. Once the range image is generated, the method may proceed to step 580.

At step 580, a range to target 150 is determined using the appropriate range image. In some embodiments, detection and ranging module 205 determines the range to target 120 using the range image for a particular field of view. In other embodiments, detection and ranging module 205 may determine a range to target 120 using a range image for field of regard 110. In some embodiments, a range to target 120 may be determined by measuring the point spread, functions between the first image and the second image. The range to target 120 may be determined by means of a threshold operation on the range image. Targets near unmanned vehicle 105 may appear as blobs in the threshold limited range image and may thus be further processed by tracking algorithms or other methods in an embodiment. In some embodiments, range may be determined by knowing the precise focal length and focal ratio of focal plane array 238 at each field of view setting. Optical system 107 may be calibrated to provide range as a function of the amount of defocus and translation imaged by optical system 107.

At step 590, it is determined whether there are any fields of view 115A-115D remaining in field of regard 110 of optical system 107. In some embodiments, there may be a predetermined number of fields of view 115A-115D within a field of regard 110. Detection, and ranging module 205 may count how many fields of view 115A-115D have been processed and subtract that amount from the predetermined number of fields of view 115A-115D in some embodiments. If the resulting number is non-zero, then detection and ranging module 205 determines that there is at least one field of view 115A-115D remaining. If there is at least one field of view 115A-115D remaining, method 500 proceeds back to step 510. Otherwise, method 500 ends.

As an example embodiment of operation, detection and ranging module 205 positions rotating disk 234 in a first position corresponding to a first section 410A of a plurality of sections 410A-410D of rotating disk 234. For example, detection and ranging module 205 may send a signal to rotating disk 234 causing rotating disk 234 to rotate into a first position. Each section 410A-410D may have a different focal length. Focal plane array 238 may capture a first image representing a first field of view 115A while rotating disk 234 is in the first position. Focal plane array 236 may send the first image to detection and ranging module 206 via network 250. Detection and ranging module 205 may receive the first image and analyze the first image to determine whether to adjust mirrors 310 on spatial light modulator 226. For example, detection and ranging module 205 may determine that more or less light 242 should pass to focal plane array 238 based on an analysis of the first image. Detection and ranging module 205 may then send a signal to spatial light modulator 226 through network 250 causing spatial light modulator 526 to adjust mirrors 310. Detection and ranging module 205 may also send a signal to rotating disk 234 causing rotating disk 234 to rotate into a second position corresponding to a second section 410B of the plurality of sections 410A-410D. In some embodiments, rotating disk 234 may simultaneously rotate while spatial light modulator 226 adjusts mirrors 310. Once mirrors 310 are adjusted and rotating disk 234 is in the second position, focal plane array 238 may capture a second image representing the first field of view 115A and send the second image to detection and ranging module 205 through network 250. Detection and ranging module 205 may receive the second image. In embodiments where rotating disk 234 includes more than two sections 410A-410D, detection and ranging module 205 may perform the above steps for each of the additional sections 410A-410D. Detection and ranging module 205 may then generate a range image of field of view 115A using at least the first and second images representing the first field of view 115A. Detection and ranging module 205 may use the range image to determine a range to target 120. Detection and ranging module 205 may determine it there are additional fields of view 115A-115D remaining. If there are fields of view 115A-115D remaining in field of regard 110, detection and ranging module 205 may perform the above steps for each remaining field of view 115A-115D.

Optical system 105 provides numerous advantages. Optical system 107 eliminates the piezo-electric motion control element for focal plane array 238, which may eliminate potential vibration problems at focal plane array 238. Additionally, eliminating the piezo-electric motion control element reduces the weight, volume, and cost associated with optical system 103. Furthermore, optical system 107 may operate at a higher frame rate because of the elimination of the piezo-electric motion control element. Moreover, optical system 107 captures images and determines a range to target 120 without detectable emissions, such as radar, laser, or acoustics.

Although the present disclosure has been described with several embodiments, a myriad of changes, variations, alterations, transformations, and modifications ray be suggested to one skilled in the art, and it is intended that the present disclosure encompass such changes, variations, alterations, transformations, and modifications.

What is claimed is:

1. A system, comprising:
one or more memory units; and
one or more processors communicatively coupled to the one or more memory units and operable to:
for each field of view of a plurality of fields of view forming a field of regard:
position a rotating disk in a first position corresponding to a first section of a plurality of sections of the rotating disk, each section of the plurality of sections having a different focal length;
receive a first image representing a first field of view captured while the rotating disk was in the first position;
analyze the first image to determine whether to adjust a plurality of mirrors on a spatial light modulator;
adjust the plurality of mirrors based on the analysis;
position the rotating disk in a second position corresponding to a second section of the plurality of sections; and
receive a second image representing the first field of view captured while the rotating disk was in the second position;
generate a range image of the field of view using at least the first image and the second image; and
determine a range to a target using the range image.

2. The system of claim 1, wherein each section of the plurality of sections of the rotating disk has a different thickness or a different index of refraction.

3. The system of claim 1, wherein the processor is further operable to analyze the first image by determining a level of brightness associated with the image.

4. The system of claim 1, wherein, for at least one of the plurality of fields of view, the rotating disk is positioned in each of the plurality of sections a plurality of times.

5. The system of claim 1, wherein the rotating disk is positioned a number of times corresponding to a number of sections of the rotating disk and the plurality of mirrors are adjusted each instance that the rotating disk is positioned.

6. The system of claim 1, wherein the target is an airborne object.

7. A non-transitory, computer-readable medium comprising logic, the logic operable, when executed by a processor, to:
for each field of view of a plurality of fields of view forming a field of regard:
position a rotating disk in a first position corresponding to a first section of a plurality of sections of the rotating disk, each section of the plurality of sections having a different focal length;
receive a first image representing a first field of view captured while the rotating disk was in the first position;
analyze the first image to determine whether to adjust a plurality of mirrors on a spatial light modulator;
adjust the plurality of mirrors based on the analysis;
position the rotating disk in a second position corresponding to a second section of the plurality of sections; and
receive a second image representing the first field of view captured while the rotating disk was in the second position;
generate a range image of the field of view using at least the first image and the second image; and
determine a range to a target using the range image.

8. The computer-readable medium of claim 7, wherein each section of the plurality of sections of the rotating disk has a different thickness.

9. The computer-readable medium of claim 7, wherein each section of the plurality of sections of the rotating disk has a different index of refraction.

10. The computer-readable medium of claim 7, wherein the logic is further operable to analyze the first image by determining a level of brightness associated with the image.

11. The computer-readable medium of claim 7, wherein, for at least one of the plurality of fields of view, the rotating disk is positioned in each of the plurality of sections a plurality of times.

12. The computer-readable medium of claim 7, wherein the rotating disk is positioned a number of times corresponding to a number of sections of the rotating disk and the plurality of mirrors are adjusted each instance that the rotating disk is positioned.

13. The computer-readable medium of claim 7, wherein the target is an airborne object.

14. A method, comprising:

for each field of view of a plurality of fields of view forming a field of regard:
- positioning a rotating disk in a first position corresponding to a first section of a plurality of sections of the rotating disk, each section of the plurality of sections having a different focal length;
- receiving a first image representing a first field of view captured while the rotating disk was in the first position;
- analyzing the first image to determine whether to adjust a plurality of mirrors on a spatial light modulator;
- adjusting the plurality of mirrors based on the analysis;
- positioning the rotating disk in a second position corresponding to a second section of the plurality of sections; and
- receiving a second image representing the first field of view captured while the rotating disk was in the second position;
- generating a range image of the field of view using at least the first image and the second image; and
- determining a range to a target using the range image.

15. The method of claim 14, wherein each section of the plurality of sections of the rotating disk has a different thickness.

16. The method of claim 14, wherein each section of the plurality of sections of the rotating disk has a different index of refraction.

17. The method of claim 14, wherein analyzing the first image comprises determining a level of brightness associated with the image.

18. The method of claim 14, wherein the rotating disk is positioned a number of times corresponding to a number of sections of the rotating disk and the plurality of mirrors are adjusted each instance that the rotating disk is positioned.

19. The method of claim 14, wherein the spatial light modulator receives light from a collimator.

20. The method of claim 14, wherein:

adjusting the plurality of mirrors on the spatial light modulator based on the analysis comprises adjusting the plurality of mirrors to change an amount of light passed to a focal plane array; and positions of the rotating disk are synchronized with adjustments to the plurality of mirrors on the spatial light modulator.

\* \* \* \* \*